April 27, 1926.

J. F. PRENOSIL

VEHICLE FRAME STRUCTURE

Original Filed Feb. 7, 1924  2 Sheets-Sheet 1

1,582,781

Inventor
J. F. Prenosil

By Bryant & Lowry
Attorneys

April 27, 1926.

J. F. PRENOSIL 1,582,781

VEHICLE FRAME STRUCTURE

Original Filed Feb. 7, 1924    2 Sheets-Sheet 2

Inventor
J. F. Prenosil

By Bryant & Lowry
Attorneys

Patented Apr. 27, 1926.

1,582,781

UNITED STATES PATENT OFFICE.

JOSEPH F. PRENOSIL, OF GEORGETOWN, MINNESOTA.

VEHICLE FRAME STRUCTURE.

Original application filed February 7, 1924, Serial No. 691,210. Divided and this application filed November 13, 1924. Serial No. 749,735.

*To all whom it may concern:*

Be it known that I, JOSEPH F. PRENOSIL, a citizen of the United States of America, residing at Georgetown, in the county of Clay and State of Minnesota, have invented certain new and useful Improvements in Vehicle Frame Structures, of which the following is a specification.

This invention relates to new and useful improvements in vehicle frame structure.

An important object of the invention is to provide a vehicle frame structure which may be successfully employed for carrying agricultural implements in the form of ground or plant working elements.

A further object of the invention is to provide improved means for controlling the direction of travel of the machine so that straight rows of plants may be followed or furrows may be formed.

Other objects and advantages of the invention will be apparent during the course of the following description.

The subject matter of this invention is disclosed in my copending application for beet blockers, filed February 7, 1924, Serial No. 691,210 but is not claimed therein, the present application being a division of the said application Serial No. 691,210.

Figure 1:
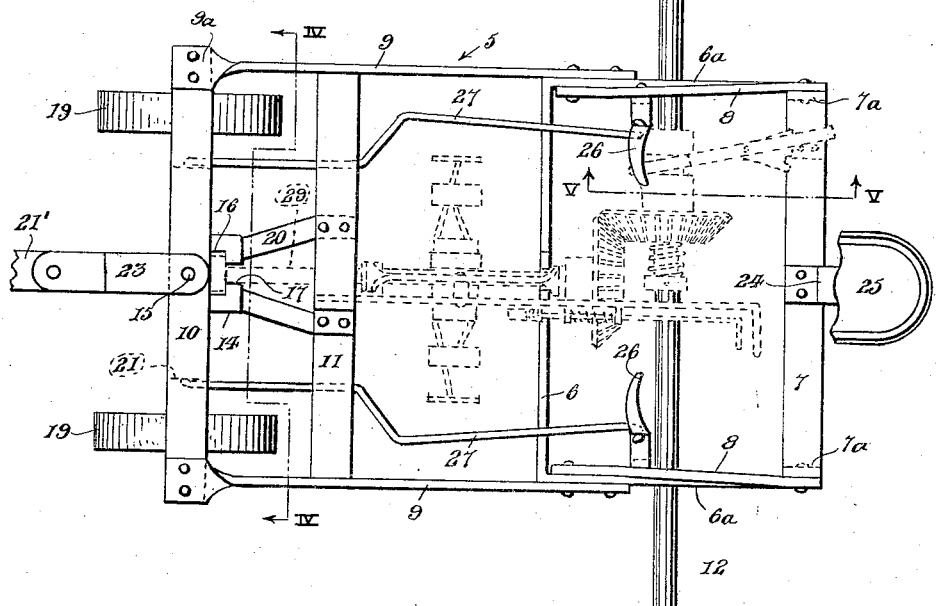
Figure 4:
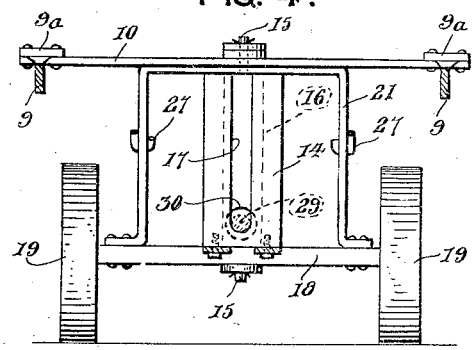
Figure 5:
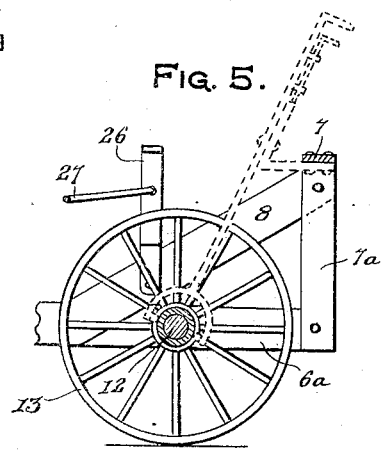
Figure 2:
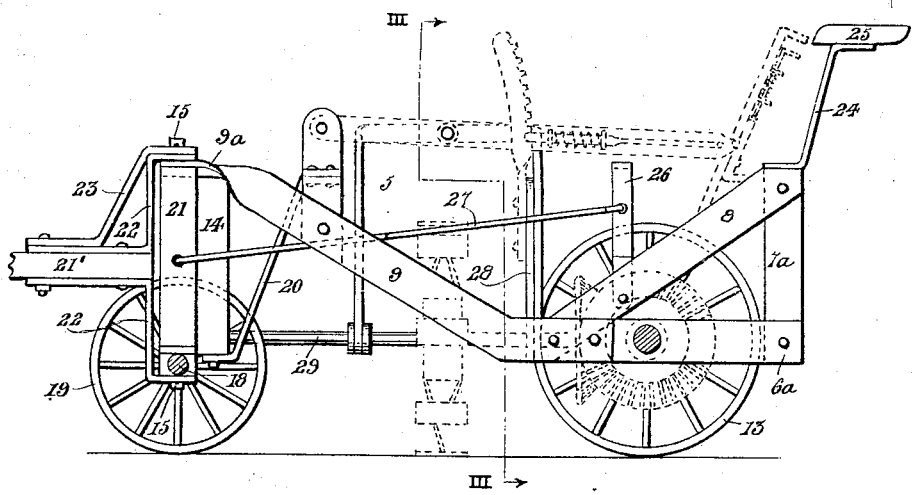
Figure 3:
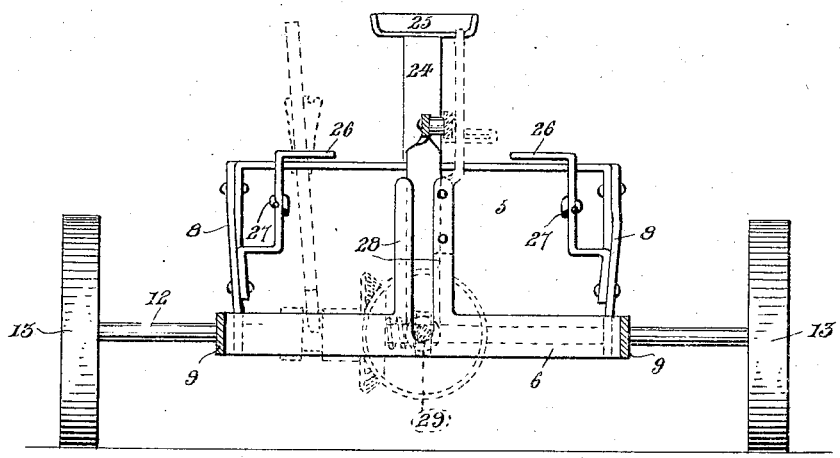

In the accompanying drawing forming a part of this specification and in which like numerals are employed to designate like parts throughout the same, Figure 1 is a top plan view of the vehicle frame structure embodying this invention, Figure 2 is a side elevational view of Fig. 1, Figure 3 is a transverse sectional view taken upon lines III—III of Fig. 2, Figure 4 is a transverse sectional view taken upon line IV—IV of Fig. 1, and Figure 5 is a fragmentary longitudinal sectional view taken upon line V—V of Fig. 1.

In the drawing, wherein for the purpose of illustration is shown the preferred embodiment of this invention, the numeral 5 designates the frame portion of the vehicle which consists of a horizontally extending inverted U-shaped rear portion 6 having the side arms $6^a$. Connected to the rear ends of these side arms $6^a$ is a vertically extending, U-shaped frame portion 7 having side arm portions $7^a$ to the upper ends of which the diagonally extending brace arms 8 are secured which extend forwardly and downwardly to be connected to the inner face of the forward ends of the side arms $6^a$. Secured to the forward ends of the side arms $6^a$ are the forwardly, upwardly extending angular bars 9 which are twisted at their forward ends through 180° of a circle to provide end portions $9^a$ for the purpose of being connected to a horizontally extending cross bar 10. Secured to the opposite side bars 9 is the substantially inverted U-shaped cross brace 11 which is positioned forwardly of the longitudinal center of the said bars 9. It is to be understood that the elements so far referred to are rigid in respect to each other.

The rear portion of the frame 5 is supported by the rear axle 12 which is journaled in the side arms $6^a$ and carries the ground engaging wheels 13 which are suitably keyed thereto. In Fig. 4 there is illustrated a perpendicularly extending block 14 having the axially extending integral pins 15 formed at the opposite ends thereof, as illustrated. This block 14 is illustrated in Figs. 1 and 4 as having a vertically extending well 16 formed therein with a slot 17 formed in the rear face thereof and extending from a point spaced slightly from the bottom end of the block 14 and opening through the upper end of the said block. It will be noted that the upper axial pin 15 passes through the forward horizontal bar 10 while the lower pin passes through the front axle 18 of the vehicle. This front axle is provided with the loosely mounted front ground engaging wheels 19, as illustrated. For the purpose of bracing the lower end of the block 14, reversely bent braces 20 are secured to the lower end thereof and extend upwardly and rearwardly to be secured to the under face of the transversely extending portion of the substantially U-shaped cross brace 11. Mounted upon the upper axial pin 15, between the upper end of the block 14 and the brace bar 10, is an inverted U-shaped member 21 which is connected at its lower ends to the front axle 18 at points spaced inwardly from the opposite ends thereof. It is to be understood that the braces 20 will prevent the block 14 from moving in respect to the frame portion of the machine and that the axle 18 and inverted U-shaped member 21 are rigid in respect to each other, but are pivotally mounted upon the pins 15 for permitting the axle to be pivoted to steer the vehicle over the ground. In Figs. 1 and 2 there is shown a tongue 21' which is pivotally secured to the pins 15 carried by the block 14 by means of the oppositely extending reversely bent angle brackets 22, one of which engages each of the said pins 15. There is further provided a reversely bent brace 23 which is connected to the tongue 21' at its lower end and to the upper pin 15 at its inner upper end.

Carried by the vertically extending inverted U-shaped frame member 7 is an angle bracket 24 having a driver's seat 25 secured to the upper end thereof. For the purpose of providing means, convenient to the driver upon the seat 25, for steering the vehicle, foot levers 26 are pivotally secured to the diagonally extending brace bars 8 and are connected, intermediate their ends, to the rods 27 which extend forwardly and are connected to the opposite sides of the inverted U-shaped member 21, as best illustrated in Figs. 1, 2 and 4.

In Figs. 1, 2 and 3, the transversely extending portion of the U-shaped horizontally extending frame part 6 is shown as being provided with a pair of upstanding spaced arms 28 which are so positioned that the space therebetween is in longitudinal alinement with the slot 17 formed in the block 14. Loosely mounted within the slot 17 and the space between the said arms 28 is a horizontally extending driven shaft 29 having an enlarged head 30 at its forward end which is positioned within the well 16. This shaft 29 is provided for supporting the agricultural implement to be carried by the vehicle.

It is now believed that the construction of the vehicle frame embodying this invention will be understood from the above detail description. It might be noted that the direction of travel of the vehicle may be changed laterally in either direction by pivoting the foot levers 26, whereby the front axle 18 with its rigid, inverted U-shaped member 21 will pivot independently of the remainder of the frame.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

In a device of the class described, a vehicle frame including a rear axle having ground engaging wheels, a transversely extending brace bar at its forward end, and a perpendicular block rigid with respect to the frame and having axially alined pins extending perpendicularly from opposite ends thereof with the upper pin projecting through the said transverse brace bar; a front axle pivoted on the lower pin and having ground engaging wheels, an inverted U-shaped member having its transverse portion centrally pivoted on the upper pin of the block below the transverse brace bar and having its lower ends fastened to the front axle, and means for pivoting the front axle and its inverted U-shaped member in respect to the frame.

In testimony whereof I affix my signature.

JOSEPH F. PRENOSIL.